United States Patent
Naigeon et al.

(12) 
(10) Patent No.: US 12,458,933 B2
(45) Date of Patent: Nov. 4, 2025

(54) BEVERAGE POURING DEVICE, COMPRISING A CENTRAL AIR INJECTOR

(71) Applicant: AVEINE, Paris (FR)

(72) Inventors: Nicolas Naigeon, Alfortville (FR); Nicolas Kamenoff, Alfortville (FR); Matthieu Robert, Alfortville (FR)

(73) Assignee: AVEINE, Paris (FR)

( * ) Notice: Subject to any disclaimer, the term of this patent is extended or adjusted under 35 U.S.C. 154(b) by 605 days.

(21) Appl. No.: 16/475,985

(22) PCT Filed: Feb. 16, 2017

(86) PCT No.: PCT/FR2017/000031
§ 371 (c)(1),
(2) Date: Jul. 3, 2019

(87) PCT Pub. No.: WO2018/150103
PCT Pub. Date: Aug. 23, 2018

(65) Prior Publication Data
US 2021/0138409 A1     May 13, 2021

(51) Int. Cl.
*B01F 23/2361*     (2022.01)
*B01F 23/237*      (2022.01)
(Continued)

(52) U.S. Cl.
CPC ........ *B01F 23/2361* (2022.01); *B01F 25/313* (2022.01); *B01F 33/5011* (2022.01);
(Continued)

(58) Field of Classification Search
None
See application file for complete search history.

(56) References Cited

U.S. PATENT DOCUMENTS

| 4,494,452 A | 1/1985 | Barzso |
| 4,595,121 A * | 6/1986 | Schultz ............... B67D 1/0885 |
| | | 116/DIG. 8 |

(Continued)

FOREIGN PATENT DOCUMENTS

| CN | 101348228 A | 1/2009 |
| FR | 3 007 999 A1 | 1/2015 |

(Continued)

OTHER PUBLICATIONS

Takeuchi translation (Year: 2012).*
International Search Report, issued in PCT/FR2017/000031, dated Nov. 9, 2017.

*Primary Examiner* — Matthew G Marini
(74) *Attorney, Agent, or Firm* — Birch, Stewart, Kolasch & Birch, LLP

(57) ABSTRACT

A device for pouring a liquid coming from a container provided with a neck includes a housing provided with a system for securing to the container; a tube that is able to inserted into the neck, this tube defining a pouring duct; a pump including: a compressor provided with at least one air inlet, with an air outlet and with a mobile assembly that is able to bring the air inlet and the air outlet into fluidic communication, and an electric motor coupled to the mobile assembly; an injector which is connected to the air outlet of the compressor by way of an upstream end and opens into the centre of the pouring duct by way of a downstream end.

19 Claims, 3 Drawing Sheets

(51) Int. Cl.
*B01F 25/313* (2022.01)
*B01F 33/501* (2022.01)
*B01F 35/22* (2022.01)
*B01F 35/71* (2022.01)
*B01F 101/17* (2022.01)

(52) U.S. Cl.
CPC ...... *B01F 35/2205* (2022.01); *B01F 35/2206* (2022.01); *B01F 35/2207* (2022.01); *B01F 35/7176* (2022.01); *B01F 23/237611* (2022.01); *B01F 2101/17* (2022.01)

(56) References Cited

U.S. PATENT DOCUMENTS

| | | | |
|---|---|---|---|
| 4,801,249 A * | 1/1989 | Kakizawa | A61B 5/0235 92/48 |
| 2014/0113045 A1 * | 4/2014 | Njaastad | A23L 2/54 426/477 |
| 2016/0175783 A1 | 6/2016 | Jarrousse et al. | |
| 2016/0214071 A1 | 7/2016 | Stevenson et al. | |
| 2016/0325243 A1 * | 11/2016 | McDonald | B67D 1/10 |
| 2016/0354733 A1 * | 12/2016 | Chung | B67D 1/10 |

FOREIGN PATENT DOCUMENTS

| | | | | |
|---|---|---|---|---|
| JP | 2012197081 A | * | 10/2012 | ............ B67D 1/04 |
| WO | WO 2015/058556 A1 | | 4/2015 | |

* cited by examiner

BEVERAGE POURING DEVICE, COMPRISING A CENTRAL AIR INJECTOR

The invention relates to the field of food and drink, and more specifically to the field of beverages. It relates more specifically to a device for pouring a liquid, and in particular for pouring an alcoholic beverage, typically wine.

Wine, known since ancient times, is a beverage resulting from alcoholic fermentation of grape must. The organoleptic properties thereof vary as a function of various criteria, among which the grape variety (cépage), terroir (land), wine-producing method, the method and length of storage. The variety of these criteria explains the variety and complexity of the aromas given off by a wine, be it to the nose or in the mouth.

Oenology contributes many things not only to vine-growing and winemaking, but also to wine-tasting. While it has long been known that air (and more specifically oxygen) has effects on the organoleptic properties of wine, it is modern chemistry that has systematized analysis of those effects. Today, we know that, during aging of wine in casks or in bottles, oxygen plays a part in the slow oxidation of the phenolic compounds, to the extent that micro-oxygenation techniques have been developed that consist of injecting measured quantities of oxygen into the casks, as explained by E. Anli in "*A review of micro-oxygenation application in wine*", Institute of Brewing & Distillery, 2012, 118: 368-385.

Unaware of such sophisticated techniques, the average consumer generally does no more than to open a bottle and to expose the wine to air to let it "breathe", thereby affecting the wine's nose (i.e. its fragrance), its colour thereof, and its taste thereof. Few consumers know for which wine and when to use a carafe, how long to wait between opening the bottle and serving the wine, and how long to wait between serving the wine and tasting it, or indeed what type of glass is most suitable for serving it in.

Roughly speaking, such average knowledge might be summed up by the following oversimplification: "to be good, wine should be aerated" (or "left to breathe"). However, it is well known that a wine left open to the air for a rather long time enough loses part of its taste.

While it is common for a consumer who is planning to organise wine-tasting to ask the winegrower or the wine merchant for their advice, such advice is rarely applied correctly and, in the vast majority of cases, wine-tasting, when conducted improperly, is not able to do justice either to the wine or to the producer thereof.

To improve the quality of the wine-tasting, pouring devices have consequently been proposed that are designed to provide forced oxygenation of the wine by feeding air to it.

Thus, French patent FR3007999 (10 Vins)—or the US equivalent thereof, US2016175783—discloses a machine for dispensing wine from a container such as a cartridge. The wine is suctioned from the cartridge by means of a needle; oxygen from the air is fed to the wine by means of a Venturi tube, and it is heated by Peltier effect before it is poured into a glass.

This machine has several drawbacks:
firstly, it is stationary and cannot be taken to the table by the sommelier in a restaurant environment;
secondly, it is bulky;
thirdly, the wine is drawn from the bottom of the container, where solid deposits might have built up (typically sediment or crystals); and
fourthly, it is necessary to turn the container upside down and to mount it on the machine neck down, which leads to tedious handling operations; pouring is not natural, with the machine operating similarly to a draught beer system or to a coffee machine.

U.S. Pat. No. 4,494,452 also discloses a wine aerator device that has a housing designed to be mounted on the neck of a bottle, and, mounted in the housing, a diaphragm pump connected to an injector that extends into the wine to feed pumped oxygen to it.

That device itself also has several drawbacks:
firstly, it does not make it possible to pour the wine;
secondly, inserting the injector into the wine, poses hygiene problems, insofar as the injector projects from the housing and can be exposed, to bacteriological environments while it is not being used;
thirdly, electric powering via the main supply requires the user to have and to remain within reach of an electrical power outlet; and
fourthly, the consumer is not aware of the oxygenation time for the wine, even though prolonged oxygenation can cause partial or total loss of the flavors and aromas.

The invention aims, in particular, to overcome the above-mentioned drawbacks and to achieve some and preferably all of the following objectives:
firstly, to make it possible to provide controlled aeration of the wine;
secondly, to adapt the quantity of oxygen fed to the wine as a function of the wine;
thirdly, to make it possible for the wine to be poured naturally; and
fourthly, to propose a pouring device that is portable, autonomous, and compact.

To this end, the invention firstly provides a device for pouring a liquid from a container provided with a neck, said device comprising:
a housing provided with fastening means for fastening it to the container;
a tube housed at least partially inside the housing and suitable for being inserted into the neck of the container, said tube defining a pouring duct;
a pump housed in the housing and comprising:
a compressor provided with at least one air intake, with an air outlet, and with a moving assembly suitable for putting the air intake and the air outlet into fluid communication with each other; and
an electric motor coupled to the moving assembly; and
an injector that is also housed in the housing and that, via an upstream end, is connected to the air outlet of the compressor, and, via a downstream end, opens out in the center of the pouring duct.

It is thus possible, in particular, for a predetermined quantity of air corresponding to the desired oxidation to be injected directly in the center of the liquid while said liquid is being poured. When the liquid is wine, it is thus possible to adjust the organoleptic properties thereof very accurately, to the benefit of the quality of the wine poured.

Various additional characteristics may be provided, alone or in combination. Thus:
the device can comprise a control electronic circuit including an electric generator to which the motor is connected;
the electronic circuit can comprise a processor programmed to:
take into account an oxygenation instruction linked to the quantity of air to be injected into the liquid while it is being poured; and cause the electric power delivered by the generator to the motor to vary as a function of said instruction;

the electronic circuit advantageously comprises a wireless communications interface connected to the processor;

the processor can be programmed to communicate, via the wireless communications interface, with a communicating device so as to receive the oxygenation instruction from it.

Secondly, a system for managing the quantity of air to be injected into liquids coming from containers is proposed, said system comprising:

a pouring device such as described above;

a database containing a list of liquids with each of which an oxygenation instruction is associated;

a software module (which may be implemented on a communicating device) programmed to:

identify the liquid by optical means; and interrogate the database so as to collect at least one oxygenation instruction from it.

Thirdly, a method of injecting a quantity of air into a liquid coming from a container provided with a label, by means of a such a system is proposed, this method comprising the operations consisting of:

taking a picture of the label or of a code present on said label;

identifying the corresponding liquid;

extracting at least the corresponding oxygenation instruction from the database;

taking the oxygenation instruction into account to adjust the electric power to be delivered to the motor as a function of said instruction;

delivering to the motor the power thus adjusted to start the pump and to inject the air thus pumped in the center of the liquid while it is being poured.

Other aims and advantages of the invention will appear from the description of an embodiment, given below with reference to the appended drawings, wherein.

Figure 1:
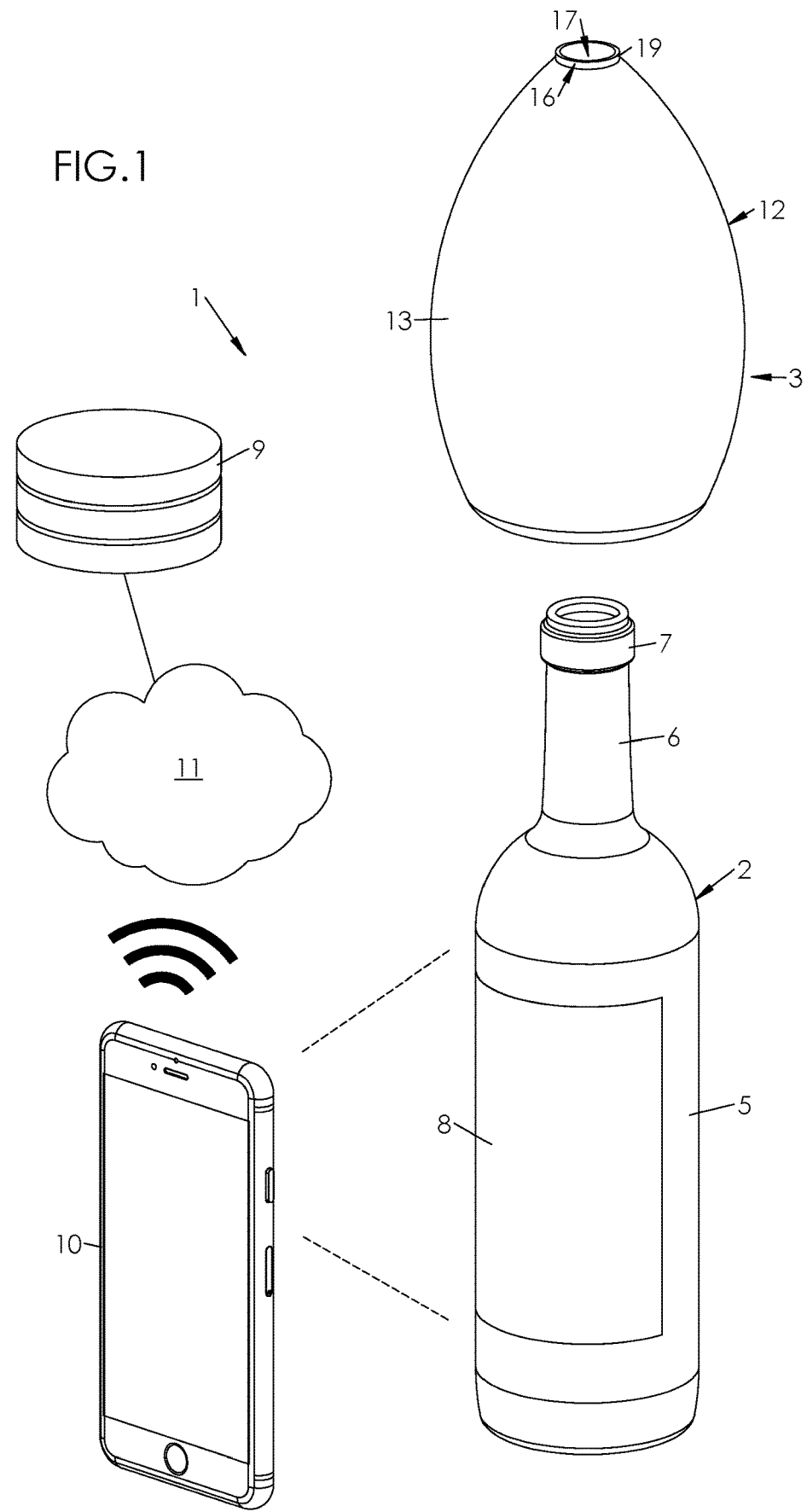
FIG. 1 is a schematic, perspective view showing a system for managing the quantity of air to be injected into a bottled beverage, via a pouring device.

FIG. 1 shows a system 1 for managing a quantity of air to be injected into liquids, and preferably beverages (and more specifically wines) coming from containers 2, and in particular bottles. To perform the injection, the management system 1 is equipped with a pouring device 3 that is described below.

FIG. 1 shows a bottle 2 containing wine 4. This bottle 2 can, conventionally, be made of glass; it comprises a body 5 underlying a neck 6 provided with a collar 7 forming a radial projection on the neck 6. A label 8 is fixed to the bottle 2, and more specifically to the body 5, e.g. by adhesive bonding. The label 8 bears information (not shown) such as the type of wine contained in the bottle 2, where it comes from, the identity of the grower/maker, and the year the grapes were picked.

Oenological studies have shown not only that oxygen from air oxidises certain phenolic compounds of the wine to the extent of affecting the organoleptic properties thereof (nose and taste) but also that those properties vary as a function of the quantity of oxygen fed to the wine.

The inventors have undertaken to systematize this approach in wine-tasting, by studying the impact of oxygenation on a large list of wines to determine, for each one, the correct quantity of oxygen to be fed to the wine to magnify the organoleptic properties as soon as the bottle 2 is opened, and by compiling a database 9 bringing together the list of the wines studied, with, for each of them, the appropriate quantity of oxygen to be fed to it.

More specifically, for each wine, the database 9 advantageously contains an entry that gives access at least to:

data identifying the wine;

an oxygenation instruction, relating to the quantity of oxygen to be fed to the wine 4 while it is being poured.

The data identifying the wine 4 is, for example, an image of the label 8 of the bottle 2 in which the wine 4 is usually packaged. By way of a variant, that data may be an identification number associated with an optical code (e.g. a bar code or a matrix code—such as a Quick Response QR code) printed on the label 8. It is also possible to store both an image of the label 8 and also an identification number, in particular when identification by image is impossible, e.g. due to substantial damage or degradation to the label 8 making image recognition difficult.

For example, the instruction may be in the form of a flow-rate of oxygen (or of air, of which the proportion of oxygen is well-known) to be delivered to the wine 4 while it is being poured, or in the form of a parameter proportional to said flow rate, e.g. electric power to be delivered to a pump that injects the oxygen. It will be noted, that the concept of "electric power" covers the concepts of electric current and of voltage, the relationship between these physical quantities being defined by Ohm's Law.

Additional information can be stored in the entry of the database 9 that corresponds to each wine. Such information may, for example, be of any of the following types:

legal or administrative: identity of the winegrower, head office or home address of said winegrower, membership of a cooperative;

technical: grape varieties used and proportions thereof, harvesting method (e.g. manual, mechanical, early, or late), presence of additives (e.g. must, sugar, or sulphites), and geological properties of the terroir (=of the vineyard) (e.g. calcareous, sandy, chalky, granitic or basalt);

oenological: olfactory and gustatory notes (e.g. fruit, flower, or mineral notes), shades adopted by the colour of the wine (e.g. ruby, or garnet); and tourism or gastronomy: history of the wine, of the winegrower, or of the vineyard, peculiarities of the region, recommendations of dishes in association with wine.

The management system is designed to:

recognise a wine;

access the database;

extract at least one oxygenation instruction from the database, inject a quantity of air that complies with this instruction.

To recognise the wine 4, the system 1 comprises a software module programmed to:

identify the wine 4 by optical means; and interrogate the database 9 to collect at least one oxygenation instruction from it.

Figure 3:
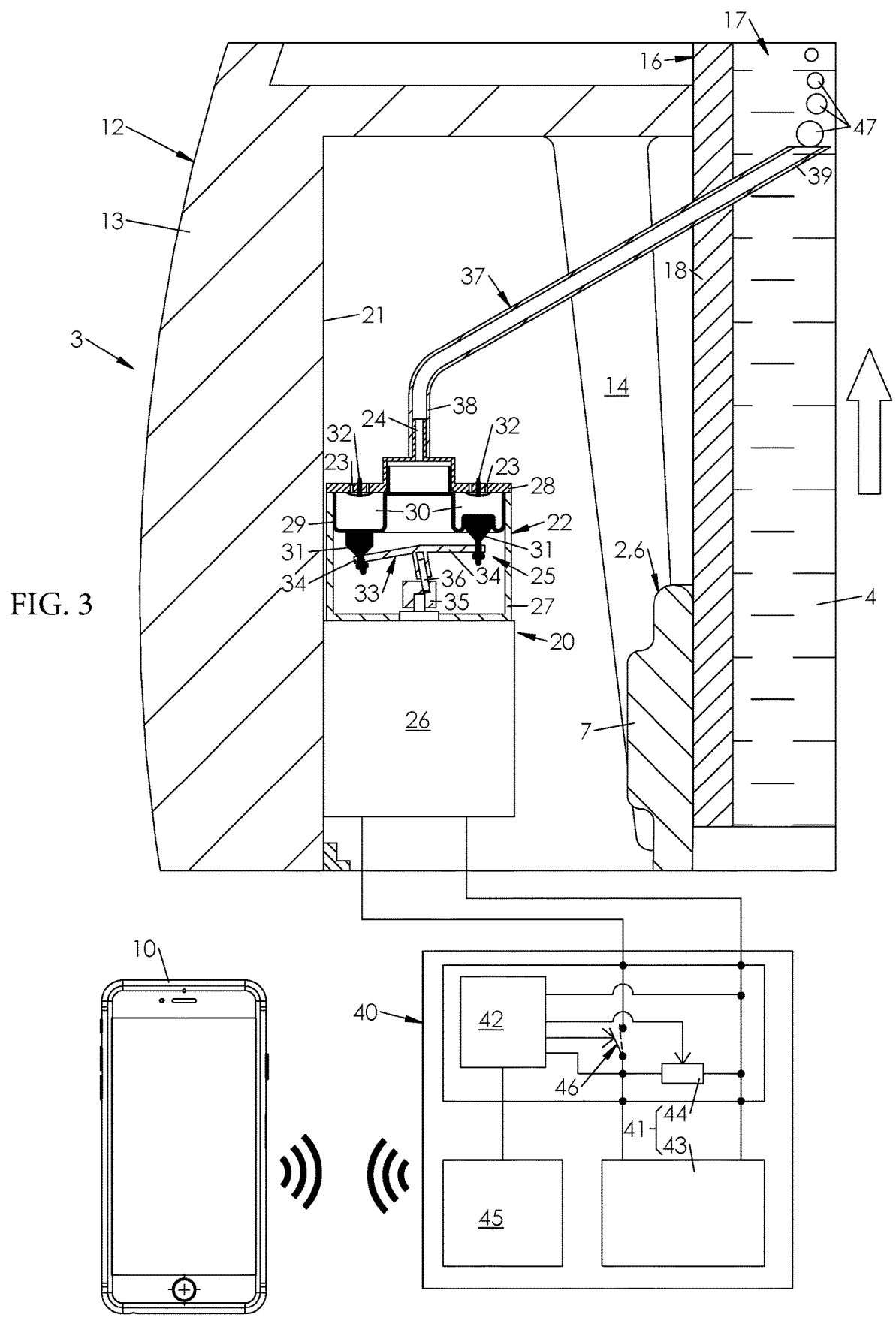
FIG. 3 is a detailed view, on a larger scale, of the pouring device according to the detail referenced III in FIG. 2, and also shows the control electronic circuit receiving an instruction from a wireless communicating device.

According to a first embodiment, said software module is implemented in a processor equipping a communicating device 10 such as a smartphone, as shown in FIG. 1 and FIG. 3. According to a second embodiment, the software module is implemented directly in a processor equipping the pouring device 3.

For example, the module is programmed to act, on receiving a command, to take a picture of the label 8 of the container 2. To this end, the module is connected to a camera equipping the communicating device 10 (or, respectively, equipping the pouring device 3).

If the wine 4 is to be identified by recognition of the label 8 thereof, the picture taken can be a photograph of the label 8 (partial or complete), as shown by the dotted lines in FIG. 1. In this case, the wine 4 is identified by means of an image recognition algorithm: parameters (in particular, colour and contrast parameters) are extracted from the image, and image correlation is performed among the images stored in the database 9 to identify the image that has the parameters closest to the parameters extracted from the photograph taken. For greater reliability, character recognition can optionally be incorporated into the program, e.g. so as to identify the name of the wine 4 directly from the label 8, thereby accelerating the process of recognition and of interrogation of the database 9.

If the wine 4 must be identified by recognition of a code (such as a barcode or a QR code), the photograph taken can be limited to the possible code present on the label 8. In this case, the identification module incorporates or communicates with a program that is dedicated to optical recognition of the codes, and that converts the image (ordinarily made up of variations in contrast) into a number. This number, which corresponds to the identification of the wine 4 in the database 9, is transmitted to said database by the device 10 (or directly by the pouring device 3).

Once the wine 4 is recognised, the corresponding data is extracted from the database 9 and is retrieved by the communicating device 10 (or directly by the pouring device 3).

According to an embodiment shown in FIG. 1, the database 9 is advantageously hosted on a remote server that is accessible via a Local Area Network (11) (LAN), a Metropolitan Area Network (MAN) or a Wide Area Network (WAN, such as the Internet). The link between the communicating device 10 (or the pouring device 3) and the network 11 is advantageously set up via the air (wireless) interface, by means of a conventional communications protocol, e.g. via a mobile telephony protocol (General Packet Radio Service or "GPRS", Enhanced Data Rates for GSM Evolution or "EDGE", Universal Mobile Telecommunications System or "UMTS", Long-Term Evolution or "LTE") or via a wireless communications protocol (e.g. IEEE 802.11, more commonly known as Wi-Fi).

When the data comprises additional information such as information of the types listed above (legal or administrative, technical, oenological, or tourism or gastronomy), that additional information is advantageously displayed on the communicating device 10 (or on the pouring device 3 if said pouring device is equipped with a screen) for the user, who can then, in particular, check that the wine's identity that is extracted from the database 9 corresponds to the information shown on the label 8.

The oxygenation instruction is either forwarded by the communicating device 10 to the pouring device 3, or is directly taken into account by the latter on the pouring device 3.

Firstly, the pouring device 3 comprises a housing 12 provided with a fastening system for fastening it to the container 2. More specifically, the housing 12 is provided with a shell 13 via which it can be mounted on the neck 6 of the container 2. In the example shown, the housing 12 is designed to come to fit over the neck 6 of a bottle 2 of wine. The necks 6 of the bottles of wine can be of a variety of shapes, but, for a majority of the bottles, the necks 6 are provided with collars 7 of diameters and of heights that are substantially identical.

The housing 12 is advantageously designed to be fastened to the container 2 by snap-fastening onto the collar 7. To this end, and according to an embodiment shown in FIG. 2, the fastening system for fastening the housing 12 to the container 2 is in the form of resilient catches 14 provided with hooks 15 that are suitable for engaging with the collar 7 by snap-fastening. The housing 12 can be provided with a plurality of resilient catches 14 of different dimensions (optionally in mutual alternation) that are suitable for snap-fastening onto collars 7 of varied diameters and heights.

The housing 12 can be made of a plastics material, e.g. of a resin of the acrylonitrile butadiene styrene (ABS) type, and optionally metal-coated, or else it can be made of a metal material, e.g. of a lightweight alloy such as Zamak.

Figure 2:
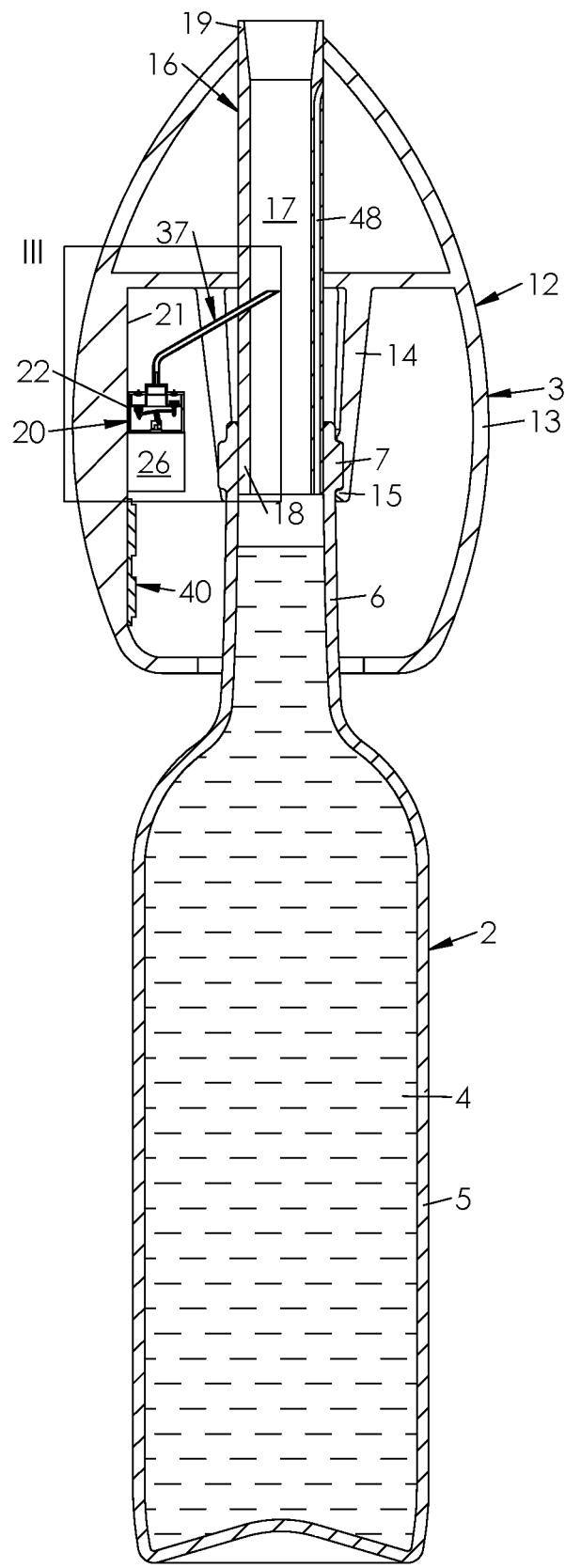
FIG. 2 is a cross-sectional view showing the pouring device as mounted on the neck of the bottle.

Secondly, the pouring device 3 comprises a tube 16 that is housed at least partially in the housing 12, and that is suitable for being inserted into the neck 6 of the container 2 to form a pouring duct 17 for pouring the wine 4, as shown in FIG. 2. This tube 16 comprises a lower section 18 that is designed to be inserted into the neck 6. For this purpose, said lower section 18 has an outside diameter less than or equal to the inside diameter of the neck 6. To facilitate inserting it into the neck 6, the lower section 18 may be beveled externally at the end thereof. The tube 16 also comprises an upper section 19 that extends the lower section 18 and forms a pouring spout for pouring the wine 4 into a glass. According to an embodiment shown in FIG. 2, the upper section 19 projects from the housing 12, although preferably to a small extent only. To limit turbulence during pouring, the upper section 19 is advantageously bevelled internally.

The tube 16 is preferably made of a food-grade plastics material, e.g. High-Density Polyethylene (HDPE). According to a particular embodiment, the tube 16 and the housing 12 are formed integrally in one piece. In this case, the entire one-piece part is made of the same food-grade material.

Thirdly, the pouring device 3 comprises a pump 20 housed in the housing 12. Said pump 20 is of small size, the order of magnitude of the largest dimensions thereof being centimetric. According to an embodiment shown in FIG. 2 and FIG. 3, the pump 20 is fastened (in particular by screwing, adhesive bonding, or welding or soldering) to an inside wall 21 of the shell 13.

The function of this pump 20 is to suction in ambient air and to inject it into the wine 4 while the wine is being poured. For this purpose, and as shown in FIG. 3, the pump 20 comprises firstly a compressor 22 provided with at least one air intake 23, with an air outlet 24, and with a moving assembly 25 suitable for putting the air intake 23 and the air outlet 24 into fluid communication with each other, and secondly an electric motor 26 coupled to the moving assembly 25.

FIG. 3 shows a possible architecture for the pump 20, of the diaphragm type, which corresponds to a known embodiment as illustrated, for example, by U.S. Pat. No. 4,801,249. According to this embodiment, the moving assembly 25 of the compressor 22 comprises the following, housed in a housing 27 that is closed by a lid 28:

- a flexible diaphragm 29 that defines air chambers 30 and that, for each air chamber 30, is provided with a protuberance forming a piston 31;
- for each air chamber 30, a flexible valve 32 mounted on the lid 28, which is provided with through holes in register with the valve 32, the through holes forming the air intake 23 for the compressor 22; and a swashplate 33 provided with branches 34, each of which is secured to a piston 31, said swashplate 33 being coupled to an outlet shaft 35 of the motor 26 via an inclined pin 36 that is free to rotate relative to the swashplate 33.

When the motor 26 is supplied with current, the outlet shaft 35 thereof is driven in rotation. The shaft 35 drives the inclined pin 36 in a rotary movement sweeping a cone, thereby driving the swashplate 33 in an oscillatory movement, and driving each piston 31 in a reciprocating translation movement. This results in alternating compression and expansion cycles for each air chamber 30.

Expansion (corresponding to the state of the left air chamber 30 in FIG. 3) causes the valve 32 to move away from the lid 28 and causes air to be suctioned into the chamber 30 through the through holes forming the air intake 23.

Conversely, compression (corresponding to the state of the right air chamber 30 in FIG. 3) presses the valve 32 against the lid 28, thereby closing off the through holes forming the air intake 23 and forcing air to be removed to the outlet 24 by deformation of the chamber 30 under the effect of the pressure.

Over the operating range of the compressor 22 thereof, the flow rate of air at the outlet of the compressor is proportional to the speed of rotation of the motor 26, which speed is itself proportional to the electric power that is delivered to it (losses by Joule effect are ignored in this example).

Fourthly, the pouring device 12 comprises an injector 37 that is also housed in the housing 12 and that has the function of injecting the air coming from the compressor 22 into the wine 4. The injector 37 has an upstream end 38 via which it is connected to the air outlet 24, and a downstream end 39 via which it opens out into the center of the pouring duct 17.

The injector 37 is advantageously in the form of a hollow needle, the downstream end 39 of which may be bevelled. In the example shown, where the pump 20 is oriented such that the outlet 24 thereof extends parallel to the pouring duct 17, the injector 37 is provided with a bend. The injector 37 may extend substantially perpendicularly to the axis of the pouring duct 17; however, it may be advantageous to incline it relative to this axis, as shown in FIG. 3.

In the example shown in FIG. 3, the injector 20 extends through the wall of the tube 16 and beyond inside the tube, preferably to the centre of the pouring duct 17. The injector 37 is advantageously made of steel, and preferably of stainless steel.

For example, it can be made of a surgical-grade steel.

Inserting the injector 37 into the pouring duct 17 can be achieved by boring the tube 16 by means of the downstream end 39. In a variant, the tube 16 is bored with a pilot hole into which the downstream end 39 of the injector 37 is inserted.

Fifthly, the pouring device 3 comprises a control electronic circuit 40 including an electric generator 41 to which the motor 26 is connected. According to an embodiment shown in FIG. 2 and FIG. 3, the electronic circuit 40 is implemented on an electronic board mounted in the housing 12, e.g. by being fastened internally to the inside wall 21 of the shell 13 (in particular by screwing, adhesive bonding, or soldering or welding).

The electronic circuit 40 advantageously comprises a processor 42 programmed to take into account the oxygenation instruction, and to cause the electric power delivered by the generator 41 to the motor 26 to vary as a function of said instruction.

FIG. 3 schematically shows one possible architecture for the electronic circuit 40. It can be seen that the generator 41 comprises a battery 43 and a variable impedance 44 (such as a resistor) controlled by the processor 42 and mounted between the terminals of the battery 43 to cause the voltage across them (and therefore the delivered power) to vary. As can be seen in FIG. 3, the terminals of the battery 43 are connected to the motor 26 to power it with electric power.

According to an embodiment, the control electronic circuit 40 further comprises a wireless communications interface 45 that is connected to the processor 42.

This wireless communications interface 45 is intended to make it possible for the processor 42 to communicate either with the communicating device 10 to receive the oxygenation instruction from it, or directly with the database 9 to receive the oxygenation instruction from it as well as other information associated with the identified wine.

In the first case, the communication interface 45 is advantageously programmed to use a short-distance, high-frequency communications protocol (e.g. of the Bluetooth type). In the second case, the communication interface 45 can be programmed to use a mobile telephony protocol (GPRS, EDGE, UMTS, LTE) or wireless protocol (e.g. IEEE 802.11, more commonly known as "Wi-Fi").

To inject air into the wine 4 while it is being poured, the procedure is as follows.

A first step consists of taking a photograph, either using the communicating device 10 or directly using the pouring device 3 if the pouring device 3 is equipped with a camera, of the label 8 or of a code (e.g. a barcode or a QR code) present on said label.

A second step consists of interrogating the database 9 via the network 11 to identify the entry (and therefore the wine) corresponding to the label 8 thus photographed or to the code thus scanned.

A third step consists of extracting the following from the database 9:
at least the oxygenation instruction stored in said entry, and corresponding to the wine 4 present in the bottle 2; and
where applicable, the legal or administrative, technical, oenological, tourism or gastronomy additional information.

A fourth step consists of transmitting at least the oxygenation instruction to the processor 42, either directly over the network 11 and through the communications interface 45, or indirectly via the communicating device 10 that forwards said instruction.

When a communicating device 10 is used, and when additional information is extracted from the database 9, that information is advantageously displayed on the screen with which the communicating device 10 is equipped.

When the pouring device 3 communicates directly with the database 9, the additional information that it receives therefrom is advantageously displayed on a screen with which the pouring device 3 is provided for that purpose.

A fifth step consists, for the processor 42, as of reception of the oxygenation instruction, of setting the power delivered by the generator 41 to a value corresponding (and in particular proportional) to said instruction. In practice, in the example shown, the processor 42 sets the impedance 44 to a value making it possible to obtain the desired electric power at the outlet of the generator 41.

A sixth step consists of starting the pump 20 by switching on the motor 26, typically by closing a switch 46 controlled by the processor 42.

The motor 26 rotating causes the compressor 22 to start, thereby injecting air (represented by the bubbles 47 in FIG. 3) into the pouring duct 17 at a flow rate corresponding to the oxygenation instruction.

The oxygen from the air thus injected into the wine 4 during pouring (in the direction indicated by the arrow in FIG. 3) procures oxidation that is instantaneous, in situ, progressive and controlled (by controlling the flow rate), of the phenolic compounds of the wine 3, thereby making it possible to improve the wine's organoleptic properties when it is tasted.

The fact that air (and therefore oxygen) is injected directly into the center of the wine 4 makes it possible for the organoleptic properties thereof to be adjusted very finely.

It will be noted, that starting the pump 20 (i.e. closing the switch 46) can be subject to wine 4 being present in the pouring duct 17. For detecting such presence, the tube 16 may be provided with a presence sensor (e.g. of the optical, resistive, or indeed capacitive type) connected to the processor 42, which is then programmed to start the pump 20 only when the sensor sends back to it a signal that is characteristic of the presence of wine 4 in the pouring duct 17.

In a variant, starting the pump 20 can be subject to the bottle 2 being inclined, i.e. to the action of pouring itself. For detecting such inclination, the pouring device 3 can be equipped with a gyroscope connected to the processor 42 and suitable for detecting an inclination of the housing 12 (and therefore of the bottle 2), the processor 42 being programmed to start the pump 20 only when the gyroscope sends it back an angle greater than a predetermined threshold value.

According to a preferred embodiment shown in FIG. 2, the pouring device 3 is provided with a vent 48 that is designed to put the pressure inside the container 2 at atmospheric pressure during the pouring to facilitate said pouring. In the example shown, said vent 48 is in the form of a duct that extends in the wall of the tube 16 and that opens out at one end at the bottom end of said tube (at the bottle 2) and at the other end in the vicinity of the top end of said tube (e.g. radially).

The above-described pouring device 3 has only one pump 20 and only one injector 37. However, in a variant, a plurality of pumps 20 and/or a plurality of injectors 37 could be provided. Thus, it is possible to provide two pumps 20 and/or two injectors 37, which can be mounted in diametrically opposite manner about the pouring duct 17, or indeed three pumps 20 and/or three injectors 37 mounted, for example, such that they are distributed uniformly at 120° intervals around the pouring duct 17.

It will be noted, that the ovoid shape of the housing 12 is given by way of example. Similarly, since the drawings are schematic, the overall size of the housing 12 is intentionally exaggerated to make the drawings clearer; it is advantageous to minimise that overall size, and that can be achieved without any difficulty in view of the miniaturisation of the components (in particular, the pump 20 and the control electronic circuit 40).

The above-described system 1 and the above-described pouring device 3 offer the following advantages.

Firstly, as already explained, injecting air into the center of the pouring duct 17 makes it possible to procure controlled aeration of the wine 4, which makes it possible to improve the organoleptic qualities thereof when it is tasted.

Secondly, the quantity of oxygen being adapted to the identified wine 4 by taking into account an oxygenation instruction stored in the database 9 makes it possible for each wine to be tasted to the best of the qualities thereof.

Thirdly, apart from the operations necessary for identifying the wine and for mounting the pouring device 3 on the bottle 2, the tasting can take place simply and naturally: the wine 4 is merely poured from the bottle 2 into a glass.

Fourthly, the compactness of the pouring device 3 makes it easier to transport it, and makes it possible, in particular, for it to be used in the restaurant trade, typically by sommeliers.

The invention claimed is:

1. A device for pouring a liquid from a container provided with a neck, said device comprising:
   a housing provided with a fastening system for fastening the housing to the container, the housing having an outer surface and an inner surface, the inner surface forming a chamber within the housing;
   a tube housed at least partially inside the housing and suitable for being inserted into the neck of the container, said tube defining a pouring duct; and
   a pump in the chamber comprising:
   a pump casing in the housing;
   a compressor provided with at least one air intake, with an air outlet, and with a moving assembly suitable for putting the air intake and the air outlet into fluid communication with each other;
   an electric motor coupled to the moving assembly; and
   an injector having an upstream end connected to the air outlet of the compressor, and a downstream end, the downstream end having an outlet opening to a center of a section of the pouring duct,
   wherein an axis of the injector at the downstream end extends substantially perpendicular or inclined to an axis of the section of the pouring duct.

2. The device according to claim 1, further comprising a control electronic circuit including an electric generator to which the motor is connected.

3. The device according to claim 2, wherein the electronic circuit comprises a processor programmed to:
   take into account an oxygenation instruction related to the quantity of air to be injected into the liquid while is the liquid being poured; and
   cause the electric power delivered by the generator to the motor to vary as a function of said oxygenation instruction.

4. The device according to claim 3, wherein the electronic circuit comprises a wireless communications interface connected to the processor.

5. The device according to claim 4, wherein the processor is programmed to communicate, via the wireless communications interface, with a communicating device to receive the oxygenation instruction therefrom.

6. A system for managing the quantity of air to be injected into liquids coming from containers, said system comprising:
   the pouring device according to claim 4;
   a database containing a list of liquids with each of which an oxygenation instruction is associated; and
   a software module programmed to:
   identify the liquid by optical means; and
   interrogate the database to collect at least one oxygenation instruction therefrom.

7. A system for managing the quantity of air to be injected into liquids coming from containers, said system comprising:
   the pouring device according to claim 3;

a database containing a list of liquids with each of which an oxygenation instruction is associated; and a software module programmed to:

identify the liquid by optical means; and interrogate the database to collect at least one oxygenation instruction therefrom.

8. The system according to claim 7, wherein the software module is implemented on a communicating device.

9. A method of injecting a quantity of air into a liquid coming from a container provided with a label, by means of the system according to claim 7, which comprises the operations consisting of:

taking a picture of the label or of a code present on said label;

identifying the corresponding liquid;

extracting at least the corresponding oxygenation instruction from the database;

taking the oxygenation instruction into account to adjust the electric power to be delivered to the motor as a function of said instruction; and delivering to the motor the power thus adjusted to start the pump and to inject the air thus pumped into the center of the liquid while the liquid is being poured.

10. The device according to claim 1, wherein the outlet of the injector opens in a direction parallel to the axis of the pouring duct.

11. The device according to claim 1, wherein the injector extends upwardly from the pump.

12. The device according to claim 1, wherein the housing comprises a partition, and wherein catches extend downwardly and inwardly from the partition.

13. The device according to claim 12, wherein the pump is below the partition.

14. The device according to claim 1, wherein the pump directly attaches to the inner surface of the housing.

15. The device according to claim 1, wherein the pump is below a top end of the tube.

16. The device according to claim 1, wherein the tube is straight.

17. A device for pouring a liquid from a container provided with a neck, said device comprising:

a housing having a top end and a bottom end, the bottom end configured to be connected to the container;

a tube housed at least partially inside the housing and suitable for being inserted into the neck of the container, said tube defining a pouring duct; and a pump comprising:

a compressor provided with at least one air intake, with an air outlet, and with a moving assembly suitable for putting the air intake and the air outlet into fluid communication with each other; and an electric motor coupled to the moving assembly; and an injector having an upstream end connected to the air outlet of the compressor, and extending upwardly to a downstream end, the downstream end having an outlet opening to a center of the pouring duct, wherein the tube extends along a central axis of the housing, the pump being located to a side of the tube, wherein the tube has an upper end at an exterior of the housing, and wherein the tube is straight.

18. The device according to claim 17, wherein the outlet of the injector opens in a direction parallel to the axis of the pouring duct.

19. The device according to claim 17, wherein the pump is below the upper end of the tube.

* * * * *